(12) United States Patent
McKean et al.

(10) Patent No.: US 8,346,990 B2
(45) Date of Patent: Jan. 1, 2013

(54) METHODS AND SYSTEMS FOR TRACKING DATA ACTIVITY LEVELS

(75) Inventors: Brian McKean, Longmont, CO (US);
Donald Humlicek, Wichita, KS (US);
James Lynn, Rose Hill, KS (US);
Timothy Snider, Derby, KS (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/017,456

(22) Filed: Jan. 31, 2011

(65) Prior Publication Data

US 2012/0198105 A1    Aug. 2, 2012

(51) Int. Cl.
*G06F 3/00* (2006.01)
*G06F 13/00* (2006.01)

(52) U.S. Cl. .............................. 710/15; 710/36; 711/161

(58) Field of Classification Search ............... 710/15–19, 710/36–42; 711/160–162
See application file for complete search history.

(56) References Cited

U.S. PATENT DOCUMENTS

| | | | |
|---|---|---|---|
| 6,035,306 A * | 3/2000 | Lowenthal et al. .................... | 1/1 |
| 6,681,309 B2 | 1/2004 | Szendy et al. | |
| 7,415,284 B2 * | 8/2008 | Hoover et al. .................. | 455/518 |
| 7,669,019 B2 * | 2/2010 | Fujibayashi et al. ........... | 711/161 |
| 7,702,865 B2 * | 4/2010 | Yamakawa et al. ............ | 711/162 |
| 2007/0118710 A1 * | 5/2007 | Yamakawa et al. ............ | 711/165 |
| 2008/0091876 A1 * | 4/2008 | Fujibayashi et al. ........... | 711/113 |
| 2010/0017574 A1 * | 1/2010 | Takahashi et al. ............. | 711/162 |
| 2010/0122020 A1 * | 5/2010 | Sikdar et al. ................... | 711/103 |

\* cited by examiner

*Primary Examiner* — Christopher B Shin

(74) *Attorney, Agent, or Firm* — Suiter Swantz pc llo

(57) ABSTRACT methods and systems for monitoring data activity may include various operations, including, but not limited to: modifying a value of at least one counter in response to one or more input/output requests directed to at least one data storage region during a first time interval; storing a first cumulative value of the counter modified in response to one or more input/output requests directed to at least one data storage region during the first time interval following the expiration of the first time interval; modifying a value of at least one counter in response to one or more requests directed to the at least one data storage region during a second time interval; storing a second cumulative value of the counter modified in response to one or more requests directed to the at least one data storage region during the second time interval following the expiration of the second time interval; and computing at least one activity index for the at least one data storage region from at least the first cumulative value and the second cumulative value.

20 Claims, 2 Drawing Sheets

METHODS AND SYSTEMS FOR TRACKING DATA ACTIVITY LEVELS

CROSS-REFERENCE TO RELATED APPLICATIONS

The present application is related to and claims the benefit of the earliest available effective filing date(s) from the following listed application(s) (the "Related Applications"): U.S. patent application Ser. No. 13/017,177, entitled METHODS AND SYSTEMS FOR MIGRATING DATA BETWEEN STORAGE TIERS naming Brian McKean and Donald Humlicek as inventors, filed concurrently herewith.

All subject matter of the Related Applications and of any and all parent, grandparent, great-grandparent, etc. applications of the Related Applications is incorporated herein by reference to the extent such subject matter is not inconsistent herewith.

SUMMARY OF INVENTION

Methods and systems for monitoring data activity may include various operations, including, but not limited to: modifying a value of at least one counter in response to one or more input/output requests directed to at least one data storage region during a first time interval; storing a first cumulative value of the counter modified in response to one or more input/output requests directed to at least one data storage region during the first time interval following the expiration of the first time interval; modifying a value of at least one counter in response to one or more requests directed to the at least one data storage region during a second time interval; storing a second cumulative value of the counter modified in response to one or more requests directed to the at least one data storage region during the second time interval following the expiration of the second time interval; and computing at least one activity index for the at least one data storage region from at least the first cumulative value and the second cumulative value.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

The present disclosure is directed to systems and methods for monitoring tracking data activity across a distributed storage system.

Reference will now be made in detail to the subject matter disclosed, which is illustrated in the accompanying drawings.

Storage system administrators may wish to know where the most active data in the storage systems resides. Such information may allow an administrator to regulate system performance by employing system components having enhanced performance characteristics in targeted areas of the storage systems in order to increase the performance of the storage system as a whole.

Further, storage system administrators may utilize localized activity data to track usage over time so that performance improvements can be planned for and performed in a timely manner such that performance degradation over time due to increased activity levels does not reach a level where it would outpace system capabilities.

Figure 1:
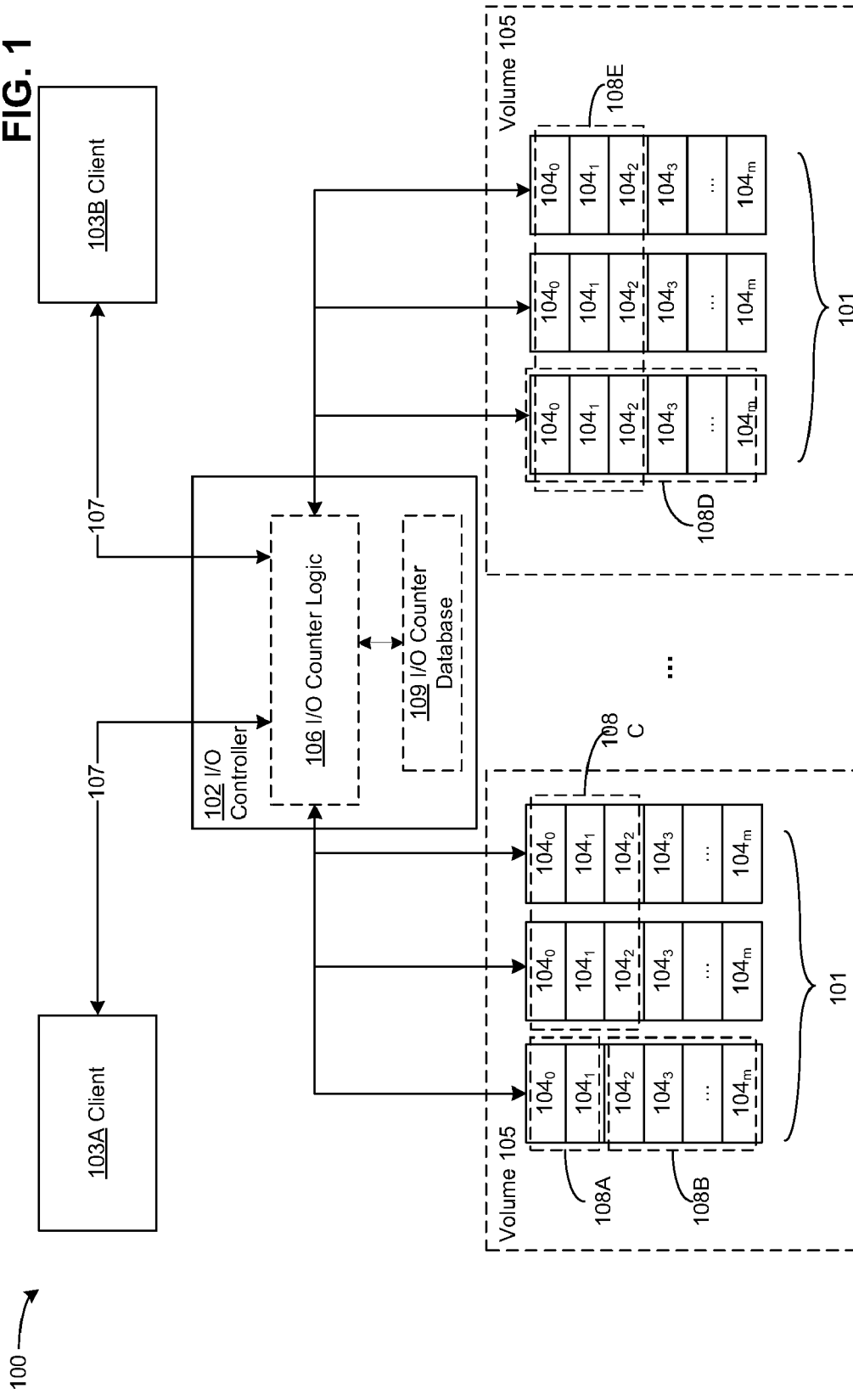
FIG. 1 illustrates a system for monitoring data activity.

Referring to FIG. 1, a distributed data storage system 100 is shown. For example, the system 100 may define a distribution of data across various drives 101. The data distribution may be controlled by an I/O controller 102. The I/O controller 102 may receive data input/output commands from at least one client device 103 and execute those commands to store or retrieve data from the drives 101.

The useable capacity of each drive 101 may be divided up into one or more drive extents 104 (e.g. m drive extents 104). Each drive extent 104 may include a given number of logical block addresses (LBAs) from a particular drive 101. The size of the drive extents 104 may be dependent on the number of drives, drive capacity, and internal firmware and other implementation-dependent requirements.

The drives 101 may be used to implement one or more virtual volumes 105. A virtual volume 105 may span one or more drives 101 wherein that grouping of drives 101 is presented to a client device 103 as a contiguous block of storage. A virtual volume 105 may be created by building stripes through a selection of drives and concatenating those stripes until a desired virtual volume capacity has been obtained.

The I/O controller 102 may further include I/O counter logic 106. The I/O counter logic 106 may be configured to receive I/O requests 107 from a client device 103 and determine the storage locations of the data associated with those I/O requests 107. The location of that data may be recorded according to a data tracking methodology (as described below) so as to determine the activity within various storage regions 108 of the drives of the system 100.

To facilitate this activity determination, the storage space of the drives 101 may be logically partitioned into data storage regions 108. A data storage region 108 may include at least a portion of a storage device (e.g. a set of blocks, a set of extents, specific LBAs). A storage device may include a physical device (e.g an HDD, SSD) or a logical device (e.g. an SCSI Logical Unit, a virtual disk, a virtual volume 105, a thinly provisioned volume, a point in time volume image, and the like.) The regions 108 may be of varying size (e.g. logical groupings of LBAs on a single drive 101 such as drive extents 104, whole drives 101, server shelves, server racks, and the like). The regions 108 may be distinct (e.g. region 108A, region 108B and region 108C) or overlap (e.g. region 108D and region 108E). Further, a region 108 may include one or more drive extents 104 of a single drive 101 (e.g. the combination of region 108A and region 108B), one or more drive extents 104 of two or more drives (e.g. region 108C) or any other combination of drive extents 104 for which data activity is to be tracked.

Figure 2:
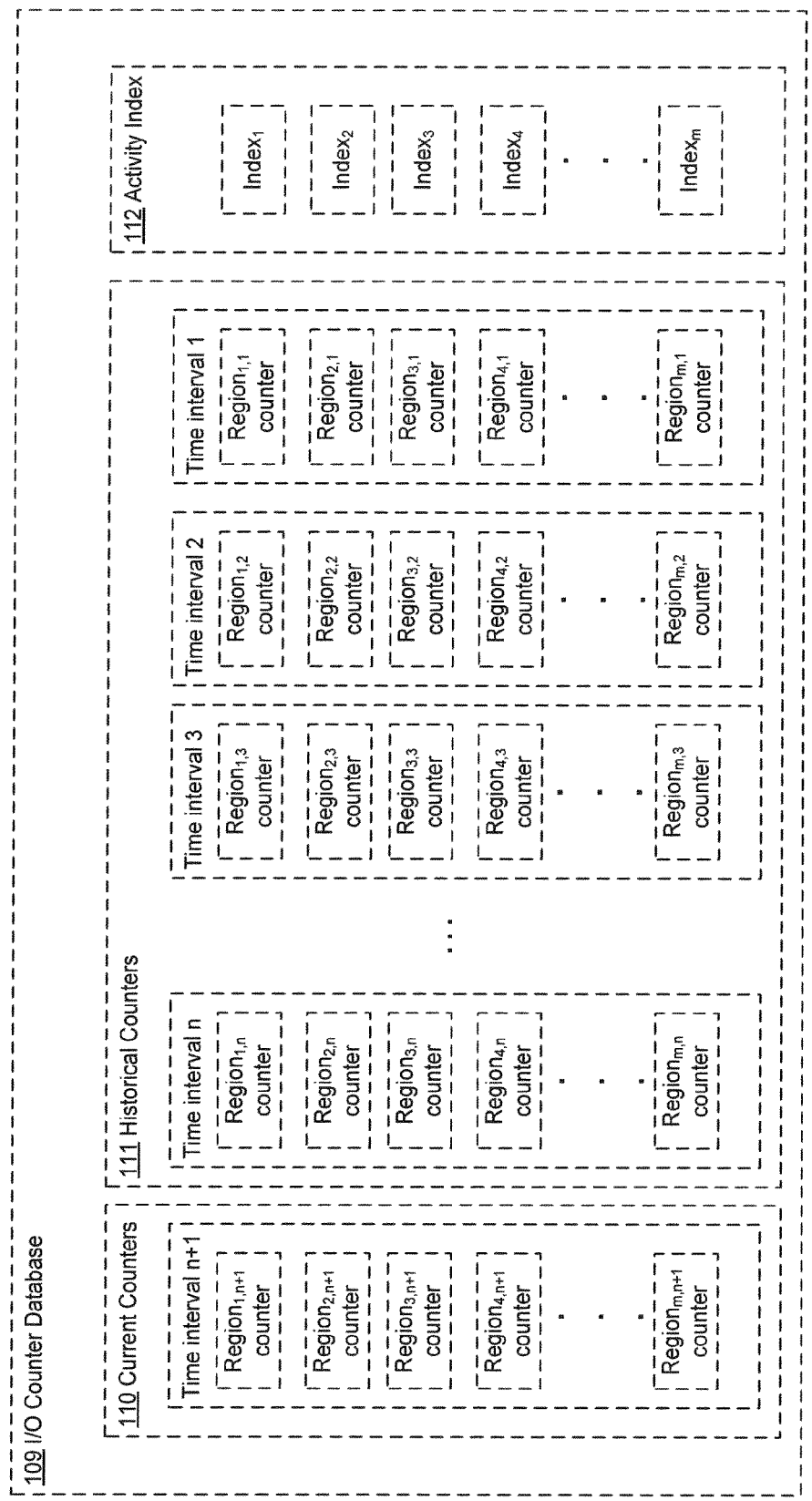
FIG. 2 illustrates a system for monitoring data activity.

Data activity for the various regions 108 may be recorded in an I/O counter database 109 maintained by the I/O controller 102. As shown in FIG. 2, the I/O counter database 109 may include counter data fields for tracking I/O requests 107 directed to each of m regions 108 over various time intervals. For example, the I/O counter database 109 may include one or more current counters 110. The current counters 110 may maintain a count of I/O requests 107 to a given region 108 during a current tracking period (e.g. from a prior point in time to present). Upon receipt of an I/O request 107 directed to a given region 108, the current counter 110 associated with that region 108 may be modified (e.g. incremented). This counting process may be continued over a given time interval (e.g. an hour, day, week, month, etc.)

Further, the I/O counter logic 106 may also record additional information regarding the I/O requests 107. For example, the I/O counter logic 106 may monitor various latency metrics associated with I/O requests 107 (e.g. average and/or maximum latency) for a set of I/O requests 107 to a given region 108 during a current tracking period.

The I/O counter database 109 may also include a set of one or more historical counters 111. The historical counters 111 may maintain counts of I/O requests 107 to a given region 108 during one or more prior elapsed time intervals (e.g. a prior hour, day, week, month, etc.). Following the passage of a given time interval (e.g. an hour), the value maintained in a current counter 110 associated with a particular region 108 may be stored to a historical counter 111 also associated with that region 108 as well as with the time interval. For example, a current counter 110 (e.g. the "Region$_0$ counter") associated with a region 108A may count I/O requests 107 addressed to region 108A over a time interval (e.g. the n+1 time interval). Following the elapsing of the n+1 time interval, the value maintained in the current counter 110 associated with a region 108A may be stored to a historical counter 111 (e.g. the "Region$_0$ counter" associated with the n$^{th}$ time interval). Each time a tracking time interval elapses, the contents of the historical counters 111 may be shifted to allow for storage of the count associated with the current counters 110, thereby progressively aging the set of historical counters 111 associated with a given time interval. As such, the historical activity of the various regions 108 may be monitored over n prior time intervals.

Upon the storage of counter values within a set of historical counters 111, those values may be used to compute a data activity index 112 representative of the historical data activity of a given region 108. For example, the activity index 112 may be a simple average of the set of historical counters 111 associated with a given region 108 (e.g.

$$\left( e.g. \ Index_m = \frac{\sum_{i=1}^{n} Region_{m,i}}{n} \right).$$

Alternately, the activity index 112 may be a weighted average of the set of historical counters 111 associated with a given region 108 (e.g. historical counters 111 that are temporally proximate to a current time interval n+1 may be weighted more heavily than those that are temporally distant, (e.g.

$$\left( e.g. \ Index_m = \left( \frac{\sum_{i=1}^{n} i \times Region_{m,i}}{n} \right) \right).$$

The current counter 110 and historical counters 111 of the I/O counter database 109 may be further customized according to various I/O activity parameters. For example, multiple I/O counter databases 109 may be maintained by the I/O controller 102 according various types of accesses by client devices 103. For example, separate I/O counter databases 109 may be maintained for read operations, write operations, I/O requests for data having a size greater or less than a threshold size (e.g. large-length and/or small-length data requests), random requests (e.g. I/O requests having starting LBAs that are distributed across an LBA space of a device with no particular relationship to a prior I/O request 107), sequential requests (e.g. I/O requests 107 where a starting LBA of a subsequent next I/O request 107 is equal to the sum of the starting LBA and block count of a prior I/O request 107) and the like.

Further, multiple I/O counter databases 109 may be maintained by the I/O controller 102 according various types of client devices 103 making I/O requests 107. For example, separate I/O counter databases 109 may be maintained for each of client device 103A and client device 103B. As such, activity indices 112 may be displayed for each client device 103, thereby providing an indication of storage access hotspots associated with each client device 103.

Still further, multiple I/O counter databases 109 may be maintained by the I/O controller 102 according various types of client devices 103 making I/O requests 107. For example, separate I/O counter databases 109 may be maintained for each of client device 103A and client device 103B. As such, activity indices 112 may be displayed for each client device 103, thereby providing an indication of storage access hotspots.

Still further, multiple I/O counter databases 109 may be aggregated according to membership of their representative regions 108 in various logical groupings (e.g. drive extents 104, virtual volumes 105, sets of virtual volumes 105, systems 100 and the like). In cases where those logical groupings occupy a set of drives 101, activity hotspots may be identified.

Further, latency information associated with I/O requests 107 obtained by the I/O counter logic 106 and maintained in the I/O counter database 109 may be also used to determine hotspots. For example, if one or more logical groupings (e.g. drive extents 104, virtual volumes 105, sets of virtual volumes 105, systems 100 and the like) has significantly higher average latency than other regions, it may be designated as a hotspot.

Still further, logical groupings (e.g. drive extents 104, virtual volumes 105, and the like) may employ differently sized regions 108, different current counter 110 rotation time intervals, different computation methodologies for activity indices 112 (e.g. simple average, weighted average and the like) or current counters 110 and historical counters 111 associated with different I/O access request types (e.g. read operations, write operations, I/O requests for data having a size greater or less than a threshold size, random requests, sequential requests, and the like).

In order to provide the client devices 103 with a view of the relative activity of various regions 108 within the drives 101, the I/O controller 102 may provide data associated with the activity indices 112 to the client devices 103. For example, a client device 103 may run a program which periodically queries the activity indices 112 associated with one or more regions. In response to such queries, the I/O controller 102 may provide data associated with those activity indices 112 to the client device 103. The client device 103 may, in turn display those activity indices 112 (e.g. via a graphical user interface) to a user or provide such activity indices 112 to the processing unit of the client device 103 for further analysis.

Further, the system 100 may employ autonomous data migration according to the activity indices 112. For example, in a case where drives 101 have varying performance capabilities (e.g. quality-of-service tiering), upon an occurrence of one or more I/O hotspots within regions 108 including lower-performance drives 101 (as determined from the activity indices 112), the I/O controller 102 may unilaterally initiate migration of data from those lower-performance drives 101 to drives 101 having enhanced performance characteristics as well as from higher-performance drives 101 to drives 101 having reduced performance characteristics. For example, the migration of data may simply be a swap of data between locations on higher-performance drives 101 and lower-performance drives 101.

Still further, multiple activity indices 112 associated with various regions 108 may be normalized (e.g. standardized to a particular activity index 112) to facilitate categorization of those regions 108 into defined activity levels. The relative populations of the activity levels as determined from the normalization operations may be provided to one or more client devices 103 in order to provide a more abstract view of system performance including variances of particular regions 108 from a normalized activity level.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation may be compiled/implemented/translated/converted into high-level descriptor languages (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, transceiver, transmission logic, reception logic, etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies.

What is claimed is:

1. A method for tracking data activity levels comprising:
    partitioning a data storage space into a plurality of data storage regions, the plurality of data storage regions including a first data storage region having a first size and a second data storage region having a second size, the first size different than the second size;
    modifying a value of a first counter in response to one or more input/output requests directed to the first data storage region during a first time interval;
    storing a first cumulative value of the first counter modified in response to one or more input/output requests directed to the first data storage region during the first time interval following the expiration of the first time interval;
    modifying a value of the first counter in response to one or more input/output requests directed to the first data storage region during a second time interval;
    storing a second cumulative value of the first counter modified in response to one or more input/output requests directed to the first data storage region during the second time interval following the expiration of the second time interval;
    modifying a value of a second counter in response to one or more requests directed to a second data storage region during the first time interval;
    storing a first cumulative value of the second counter modified in response to one or more requests directed to the second data storage region during the first time interval following the expiration of the first time interval;
    modifying a value of the second counter in response to one or more input/output requests directed to the second data storage region during a second time interval;
    storing a second cumulative value of the second counter modified in response to one or more input/output requests directed to the second data storage region during the second time interval following the expiration of the second time interval;
    computing at least one activity index for the first data storage region from at least the first cumulative value of the first counter and the second cumulative value of the first counter; and
    computing at least one activity index for the second data storage region from at least the first cumulative value of the second counter and the second cumulative value of the second counter.

2. The method of claim 1, wherein the modifying a value of a first counter in response to one or more input/output requests directed to the first data storage region during a first time interval further comprises:
    modifying a value of a counter in response to an input/output request selected from:
        one or more read requests,
        one or more write requests,
        one or more input/output requests for data having a size either greater or less than a threshold size,
        one or more random requests, and
        one or more sequential requests.

3. The method of claim 1, wherein the modifying a value of a first counter in response to one or more input/output requests directed to the first data storage region during a first time interval comprises:
    modifying a value of a first counter in response to an input/output request from a first client device directed to the first data storage region during the first time interval; and
    wherein the modifying a value of a second counter in response to one or more input/output requests directed to the second data storage region during the first time interval comprises:
    modifying a value of a second counter in response to an input/output request from a second client device directed to the second data storage region during the first time interval.

4. The method of claim 1, further comprising:
    aggregating the first counter modified in response to one or more input/output requests directed to the first data storage region during the first time interval and the second counter modified in response to one or more input/output requests directed to a second data storage region during the first time interval.

5. The method of claim 1, wherein the second time interval has a duration different than the first time interval.

6. The method of claim 1, wherein the modifying a value of a first counter in response to one or more input/output requests directed to the first data storage region during a first time interval comprises:
    modifying a value of the first counter in response to a first input/output request type directed to the first data storage region during the first time interval; and
    modifying a value of a third counter in response to a second input/output request type directed to the first data storage region during the first time interval.

7. The method of claim 1, wherein the computing at least one activity index for the first data storage region from at least the first cumulative value of the first counter and the second cumulative value of the first counter comprises:
    computing an average of at least the cumulative value of the first counter following the expiration of the first time interval and the cumulative value of the first counter following the expiration of the second time interval.

8. The method of claim 1, wherein the computing at least one activity index for the first data storage region from at least the first cumulative value of the first counter and the second cumulative value of the first counter comprises:
    computing a weighted average of at least the cumulative value of the first counter following the expiration of the first time interval and the cumulative value of the first counter following the expiration of the second time interval.

9. The method of claim 1, further comprising:
    providing at least one activity index for the first data storage region to at least one client device.

10. The method of claim 1, further comprising:
    migrating data from the first data storage region to at least the second data storage region according to the activity index for the first data storage region.

11. The method of claim 1, further comprising:
    storing information regarding latency of the input/output requests directed to the first data storage region during the first time interval.

12. A system for tracking data activity levels comprising:
    means for partitioning a data storage space into a plurality of data storage regions, the plurality of data storage regions including a first data storage region having a first size and a second data storage region having a second size, the first size different than the second size;

means for modifying a value of a first counter in response to one or more input/output requests directed to the first data storage region during a first time interval;

means for storing a first cumulative value of the first counter modified in response to one or more input/output requests directed to the first data storage region during the first time interval following the expiration of the first time interval;

means for modifying a value of the first counter in response to one or more input/output requests directed to the first data storage region during a second time interval;

means for storing a second cumulative value of the first counter modified in response to one or more input/output requests directed to the first data storage region during the second time interval following the expiration of the second time interval;

means for modifying a value of a second counter in response to one or more requests directed to a second data storage region during the first time interval;

means for storing a first cumulative value of the second counter modified in response to one or more requests directed to the second data storage region during the first time interval following the expiration of the first time interval;

means for modifying a value of a second counter in response to one or more requests directed to a second data storage region during a second time interval;

means for storing a second cumulative value of the second counter modified in response to one or more requests directed to the second data storage region during the second time interval following the expiration of the second time interval; and means for computing at least one activity index for the first data storage region from at least the first cumulative value of the first counter and the second cumulative value of the first counter; and means for computing at least one activity index for the second data storage region from at least the first cumulative value of the second counter and the second cumulative value of the second counter.

13. The system of claim 12, wherein the means for modifying a value of the first counter in response to one or more input/output requests directed to at least one data storage region during a first time interval further comprises:

means for modifying a value of a counter in response to an input/output request selected from:
one or more read requests,
one or more write requests,
one or more input/output requests for data having a size either greater or less than a threshold size,
one or more random requests, and
one or more sequential requests.

14. The system of claim 12,
wherein the means for modifying a value of the first counter in response to one or more input/output requests directed to the first data storage region during a first time interval comprises:
means for modifying a value of a first counter in response to an input/output request from a first client device directed to the first data storage region during the first time interval; and wherein the means for modifying a value of the second counter in response to one or more input/output requests directed to the first data storage region during a first time interval comprises:
means for modifying a value of a second counter in response to an input/output request from a second client device directed to the second data storage region during the first time interval.

15. The system of claim 12, further comprising:
means for aggregating
the first counter modified in response to one or more input/output requests directed to a first data storage region during the first time interval, and
the second counter modified in response to one or more input/output requests directed to a second data storage region during the first time interval.

16. The system of claim 12, wherein the second time interval has a duration different than the first time interval.

17. The system of claim 12, wherein the means for modifying a value of the first counter in response to one or more input/output requests directed to the first data storage region during a first time interval comprises:
means for modifying the value of a first counter in response to a first input/output request type directed to the first data storage region during the first time interval; and
means for modifying a value of the second counter in response to a second input/output request type directed to the first data storage region during the first time interval.

18. The system of claim 12, further comprising:
means for migrating data from the at least one data storage region to at least a second data storage region according to an activity index associated with the at least one data storage region.

19. The system of claim 12, further comprising:
storing information regarding latency of the input/output requests directed to the at least one data storage region during the first time interval.

20. A system for tracking data activity levels comprising:
circuitry for modifying a value of a first counter in response to one or more input/output requests directed to a first data storage region during a first time interval;
circuitry for storing a first cumulative value of the first counter modified in response to one or more input/output requests directed to the first data storage region during the first time interval following the expiration of the first time interval;
circuitry for modifying a value of the first counter in response to one or more requests directed to the first data storage region during a second time interval;
circuitry for storing a second cumulative value of the first counter modified in response to one or more requests directed to the first data storage region during the second time interval following the expiration of the second time interval; and
circuitry for computing at least one activity index for the first data storage region from at least the first cumulative value of the first counter and the second cumulative value of the first counter; and
circuitry for modifying a value of a second counter in response to one or more input/output requests directed to a second data storage region during the first time interval, the second data storage region sized differently than the first data storage region;

circuitry for storing a first cumulative value of the second counter modified in response to one or more input/output requests directed to the second data storage region during the first time interval following the expiration of the first time interval;

circuitry for modifying a value of the second counter in response to one or more requests directed to the second data storage region during a second time interval;

circuitry for storing a second cumulative value of the second counter modified in response to one or more requests directed to the second data storage region during the second time interval following the expiration of the second time interval; and circuitry for computing at least one activity index for the second data storage region from at least the first cumulative value of the second counter and the second cumulative value of the second counter.

* * * * *